United States Patent
Chen et al.

(10) Patent No.: US 11,169,257 B2
(45) Date of Patent: Nov. 9, 2021

(54) SECURITY INSPECTION SYSTEM AND METHOD

(71) Applicant: Nuctech Company Limited, Beijing (CN)

(72) Inventors: Zhiqiang Chen, Beijing (CN); Yuanjing Li, Beijing (CN); Xianghao Wu, Beijing (CN); Shaozhi Zhao, Beijing (CN)

(73) Assignee: Nuctech Company Limited, Beijing (CN)

( * ) Notice: Subject to any disclaimer, the term of this patent is extended or adjusted under 35 U.S.C. 154(b) by 244 days.

(21) Appl. No.: 16/233,692

(22) Filed: Dec. 27, 2018

(65) Prior Publication Data

US 2019/0196003 A1    Jun. 27, 2019

(30) Foreign Application Priority Data

Dec. 27, 2017  (CN) .......................... 201711455096.0

(51) Int. Cl.
*G01S 13/88* (2006.01)
*H04L 29/08* (2006.01)
(Continued)

(52) U.S. Cl.
CPC ............ *G01S 13/887* (2013.01); *G01N 23/04* (2013.01); *G06F 3/1454* (2013.01);
(Continued)

(58) Field of Classification Search
CPC .... G01S 13/887; G06F 3/1454; G06T 7/0004
See application file for complete search history.

(56) References Cited

U.S. PATENT DOCUMENTS

2005/0251006 A1  11/2005  Dellis
2007/0195994 A1*  8/2007  McClelland .......... G01V 5/0083
                                                                    382/103
(Continued)

FOREIGN PATENT DOCUMENTS

EP         1388124 B1       6/2012

OTHER PUBLICATIONS

"European Application Serial No. 18215910.3, Corrected European Search Report dated Aug. 2, 2019", (Aug. 2, 2019), 7 pgs.
(Continued)

*Primary Examiner* — Thomas M Hammond, III
(74) *Attorney, Agent, or Firm* — Schwegman Lundburg & Woessner, P.A.

(57) ABSTRACT

A security inspection system and a security inspection method are disclosed. The system includes: at least one inspection sub-system configured to perform ray scanning on an object to be inspected; at least one on-site image processing computer communicatively connected to the at least one inspection sub-system, and configured to store and process a radiographic image in real time; and at least one remote image processing computer communicatively connected to the at least one on-site image processing computer via at least one of a public network and a dedicated network. The at least one remote image processing computer each is configured to log in one of the at least one on-site image processing computer through remote access to synchronize remote data on a screen of the on-site image processing computer to the remote image processing computer.

9 Claims, 6 Drawing Sheets

(51) Int. Cl.
     *G01N 23/04*      (2018.01)
     *G06F 3/14*       (2006.01)
     *G06T 7/00*       (2017.01)

(52) U.S. Cl.
     CPC ........ *G06T 7/0004* (2013.01); *H04L 67/1095* (2013.01); *G01N 2223/33* (2013.01); *G06T 2207/10116* (2013.01); *G06T 2207/30112* (2013.01)

(56) References Cited

U.S. PATENT DOCUMENTS

| | | | |
|---|---|---|---|
| 2012/0062748 A1* | 3/2012 | Ofek | G06K 9/00651 348/149 |
| 2013/0034268 A1* | 2/2013 | Perron | G01V 5/0016 382/103 |
| 2013/0185331 A1 | 7/2013 | Conemac | |
| 2014/0118595 A1* | 5/2014 | Jung | G06F 3/0482 348/333.01 |
| 2015/0121523 A1* | 4/2015 | Crowley | G06Q 10/06 726/23 |
| 2015/0121528 A1* | 4/2015 | Crowley | H04L 63/1441 726/23 |
| 2016/0057416 A1* | 2/2016 | Hiriyannaiah | H04N 19/176 375/240.02 |
| 2016/0314353 A1* | 10/2016 | Winter | G06T 7/194 |
| 2017/0242148 A1* | 8/2017 | Yu | G06Q 10/083 |
| 2017/0357857 A1* | 12/2017 | Perron | G06K 9/66 |

OTHER PUBLICATIONS

"European Application Serial No. 18215910.3, Extended European Search Report dated May 9, 2019", (May 9, 2019), 9 pgs.

* cited by examiner

SECURITY INSPECTION SYSTEM AND METHOD

CROSS-REFERENCE TO RELATED APPLICATION(S)

This application claims priority to the Chinese Patent Application No. 201711455096.0, filed on Dec. 27, 2017, which is incorporated herein by reference in its entirety.

TECHNICAL FIELD

The present disclosure relates to the field of security inspection technology, and more particularly, to a security inspection system and method of an object to be inspected such as a container etc.

BACKGROUND

Radiographic imaging is a technology which is used to scan an object using a beam of rays, such as X rays, receive, by a detector, X rays which are transmitted through the object, and convert the X rays into an electrical signal. After the electrical signal is converted into a digital signal by an analog-to-digital converter, the digital signal is input to a computer for processing. Calculation is performed based on the data obtained by scanning to obtain X-ray attenuation coefficients (also referred to as absorption coefficients) of various voxels, which are arranged in a matrix form, that is, a digital matrix. Various digits in the digital matrix are converted into small squares (referred as pixels) having different grayscales ranging from black to white by a digital-to-analog converter, and are arranged in the same order as that of the original matrix to form a radiographic image. Therefore, an X-ray image is a grayscale image composed of a certain number of pixels, which is a digital image, and may be a transmission image or a reconstructed tomographic image. The resulting image is stored in a proprietary pixel dot-based format. This image is characterized by high definition, a high number of pixels per unit size, and a large image footprint.

In a large inspection system at, for example, a customs inspection station, a storage capacity for an X-ray image of a container truck is up to 30-60 Mbytes. Due to centralized review requirements of the customs, it is necessary to review images at customs inspection stations distributed at various places at a centralized review center, which puts tremendous pressure on communication lines.

SUMMARY

Embodiments of the present disclosure propose a security inspection system and method capable of reducing the pressure of transmission of data of radiographic images on communication lines.

According to an aspect of the present disclosure, there is proposed a security inspection system, comprising: at least one inspection sub-system deployed at an inspection site and configured to perform ray scanning on an object to be inspected to obtain a radiographic image of the object to be inspected; at least one on-site image processing computer deployed at the inspection site and communicatively connected to the at least one inspection sub-system, wherein the at least one on-site image processing computer each comprises a hardware device, an operating system, and an image processing application, and is configured to store and process the radiographic image in real time; and at least one remote image processing computer communicatively connected to the at least one on-site image processing computer via at least one of a public network and a dedicated network, and each configured to log in one of the at least one on-site image processing computer through remote access to synchronize remote data on a screen of the on-site image processing computer to the remote image processing computer for display of the remote data on the screen.

According to an embodiment of the present disclosure, the security inspection system further comprises: a task assignment server communicatively connected to the at least one on-site image processing computer and the at least one remote image processing computer, and configured to determine one of the at least one on-site image processing computer to be connected according to an access request from a corresponding one of the at least one remote image processing computer, and establish a communicative connection between the on-site image processing computer and the remote image processing computer.

According to an embodiment of the present disclosure, the task assignment server is further configured to perform statistics on at least one of an operational load and use efficiency of an image processing application in the on-site image processing computer during a period of time, and suggest to a user to update the on-site image processing computer.

According to an embodiment of the present disclosure, the remote image processing computer is further configured to receive a graphics command input by the operator, check whether there is an overlap among image regions changed through the graphics command, and in response to there is an overlap, merge the regions related to the graphics command to generate a display update.

According to an embodiment of the present disclosure, the remote image processing computer is further configured to adjust a screen refresh frequency of the remote image processing computer according to a size of a bandwidth in response to determining that the bandwidth is below a predetermined threshold.

According to an embodiment of the present disclosure, the remote image processing computer is further configured to filter out given image frames for a particular rendering area on the screen.

According to an embodiment of the present disclosure, the on-site image processing computer is further configured to compress the X-radiographic image, transmit the compressed X-radiographic image to the remote image processing computer for display, and in response to receiving a detail view instruction from a user, adjust a display mode of a particular rendering area to a high resolution mode.

According to another aspect of the present disclosure, there is proposed an inspection method, comprising: performing, by an inspection sub-system deployed at an inspection site, ray scanning on an object to be inspected to obtain a radiographic image of the object to be inspected; storing the radiographic image in an on-site image processing computer in real time; establishing a communicative connection between a remote image processing computer and the on-site image processing computer; and logging in, at the remote image processing computer, the on-site image processing computer through remote access, to synchronize remote data on a screen of the on-site image processing computer to the remote image processing computer for display of the remote data on the screen.

According to an embodiment of the present disclosure, the inspection method further comprises: determining, by a task assignment server, an on-site image processing computer to be connected according to an access request from the remote image processing computer, and establishing a communicative connection between the on-site image processing computer and the remote image processing computer.

According to an embodiment of the present disclosure, the inspection method further comprises: performing, by the task assignment server, statistics on at least one of an operational load and use efficiency of an image processing application in the on-site image processing computer during a period of time, and suggesting to a user to update the on-site image processing computer.

According to an embodiment of the present disclosure, the inspection method further comprises: receiving, by the remote image processing computer, a graphics command input by the operator, checks whether there is an overlap among image regions changed through the graphics command, and in response to there is an overlap, merging the regions related to the graphics command to generate a display update.

Based on the technical solutions according to the embodiments described above, the pressure of transmission of the massive radiographic images for picture reviewing on the communication lines may be reduced.

BRIEF DESCRIPTION OF THE DRAWINGS

In order to better understand the embodiments of the present disclosure, the embodiments of the present disclosure will be described in detail based on the following accompanying drawings.

DETAILED DESCRIPTION

Figure 1:
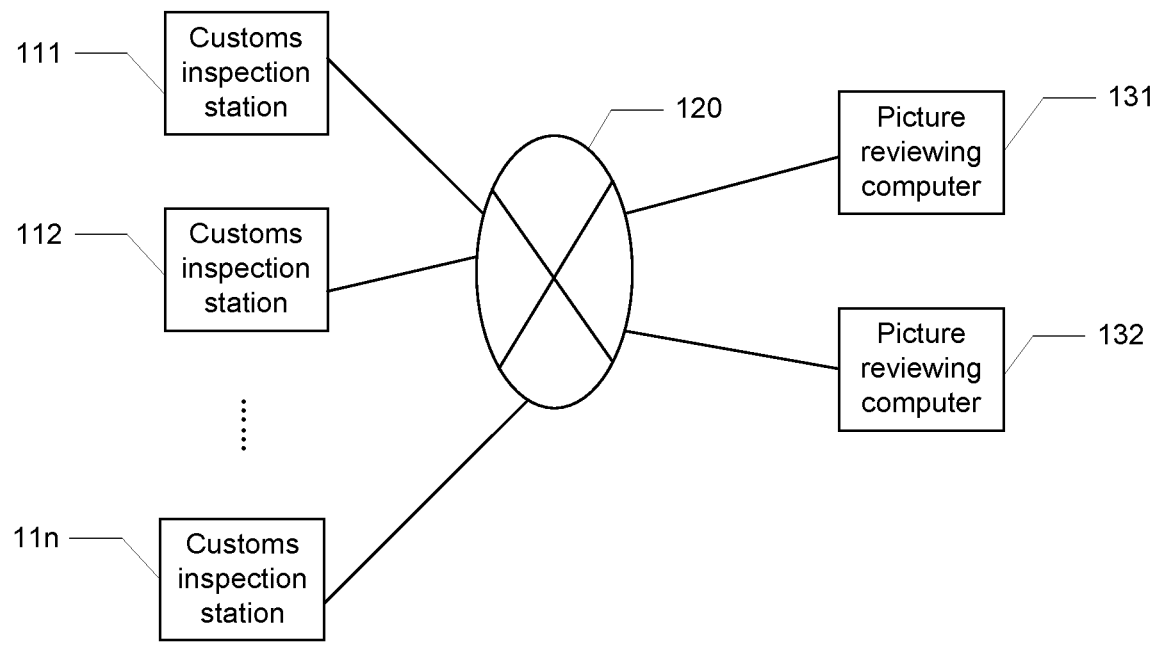
FIG. 1 illustrates a schematic structural diagram of an inspection system for containers according to an embodiment of the present disclosure.

The specific embodiments of the present disclosure will be described in detail below. It should be noted that the embodiments herein are used for illustration only, without limiting the embodiments of the present disclosure. In the description below, a number of specific details are explained to provide better understanding of the embodiments of the present disclosure. However, it is apparent to those skilled in the art that the embodiments of the present disclosure can be implemented without these specific details. In other instances, well known circuits, materials or methods are not described specifically so as not to obscure the embodiments of the present disclosure.

Throughout the specification, the reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" occurred in various positions throughout the specification may not necessarily refer to the same embodiment or example. Furthermore, specific features, structures or properties may be combined into one or more embodiments or examples in any appropriate combination and/or sub-combination. Moreover, it should be understood by those skilled in the art that the term "and/or" used herein means any and all combinations of one or more listed items.

Radiographic imaging is a technology which is used to observe an interior of an object by using rays. This technology may be used to obtain information such as a structure of the interior of the object and a density of the object without damages to the object. Currently, this technology has been widely used in various fields such as health care, national economy, scientific research etc. Chest fluoroscopy in a hospital and security inspection in stations and airports are the most common examples in daily life. The most commonly used radiation is generated by using X-rays and γ-rays. At present, radiation generated by using, for example, neutrons, protons, electrons, μ-mesons, heavy ions etc. has also been used more and more widely.

An image frame may be a single video picture which is the smallest unit in a video animation, and is equivalent to each shot on a filmstrip. A single frame may be a still picture, and continuous frames form an animation, such as a television image etc. The so called "a number of frames" is a number of image frames transmitted in one second, and it may also be understood as the times that a graphic processor may refresh an image per second, which is usually expressed by Frames Per Second (fps). Since each frame is a still picture, an illusion of motion may be formed by displaying the frames rapidly and continuously. The higher the frame rate becomes, the smoother and the more realistic the animation will be. The greater the fps becomes, the smoother the displayed motion will be.

A digital-to-analog converter, also known as D/A converter (DAC for short), is a device which converts digital quantities into analog quantities. The D/A converter may comprise four portions, i.e., a full-resistor network, an operational amplifier, a reference power supply, and an analog switch. An analog-to-digital converter, also known as A/D converter (ADC for short), is a device which converts a continuous analog signal into a discrete digital signal.

FIG. 1 illustrates a schematic structural diagram of an inspection system 100 for containers according to an embodiment of the present disclosure. As shown in FIG. 1, a security inspection device deployed at a location such as a customs inspection station etc. inspects containers to produce X-ray images and/or tomographic images. Such a single image may be 30-60 Mbytes in size. In order to meet the requirements of centralized review and confidentiality, it is often necessary to transmit all of these images to a picture reviewing center for centralized review to determine whether these images contain contraband or a smuggled item. Then, it is determined whether one of the containers is to be unpacked for inspection according to a judgment result.

For example, customs inspection devices deployed at various customs inspection stations 111, 112, 11*n* generate X-ray images respectively, which are transmitted to picture reviewing computers 131 and 132 at a picture reviewing center through a public communication network or a dedicated communication network 120, security inspection is performed on the X-ray images generated at various customs inspection stations, and then various processing and conversions are performed using professional image analysis software to give an inspection result.

The inspected images of the containers may be dual-energy images. Since a single image has approximately 30 M-60 M bytes, an image generated each time in a dual-energy mode has 60-120 Mbytes. In a dual-energy dual-viewing angle mode, an image collected each time may reach 120-240 Mbytes. In consideration of images and data generated by businesses, there is generally a large amount of data. It takes a lot of time to transmit such a large amount of data from the customs inspection devices at various customs inspection stations 111, 112, 11*n* to the picture reviewing computers 131 and 132 of the picture reviewing center. Such a time-consuming process is intolerable especially in an environment where a bandwidth is not sufficient.

According to an embodiment of the present disclosure, an image processing capability of a picture reviewing workstation in a central computer room in a centralized supervision process is weakened, and processing capabilities of image data collection sites are fully enhanced and utilized. For example, the picture reviewing computers are concentrated on processing of business data without remote acquisition and complex processing of images, and various on-site image processing computers (workstations) perform local operations and processing on images. Therefore, it is not necessary to transmit the entire image from an on-site end to the center, but it only needs to feed data of an image processing result on a screen to the picture reviewing computers of the picture reviewing center. The business data at the picture reviewing computers may be stored separately from the image data at the on-site image processing computers. In a case of an allowable bandwidth, the image data at the on-site image processing computers may also be stored centrally through a broadband path, or the on-site image data may be transmitted to the picture reviewing center by other means, such as burning an optical disc etc.

For example, a local image processing computer may be deployed at an inspection site, such as a customs inspection station. The local image processing computer may directly access image data collected by a data collection apparatus, thereby eliminating a time-consuming transmission process of images through a network. Then, a picture reviewing computer remotely logs in the on-site image processing computer, to synchronize data on a screen of the on-site image processing computer with data on a screen of the picture reviewing computer itself in real time. This amount of transmitted data is negligible as compared to that of data of the entire scanned image which is transmitted all at one time.

Figure 2:
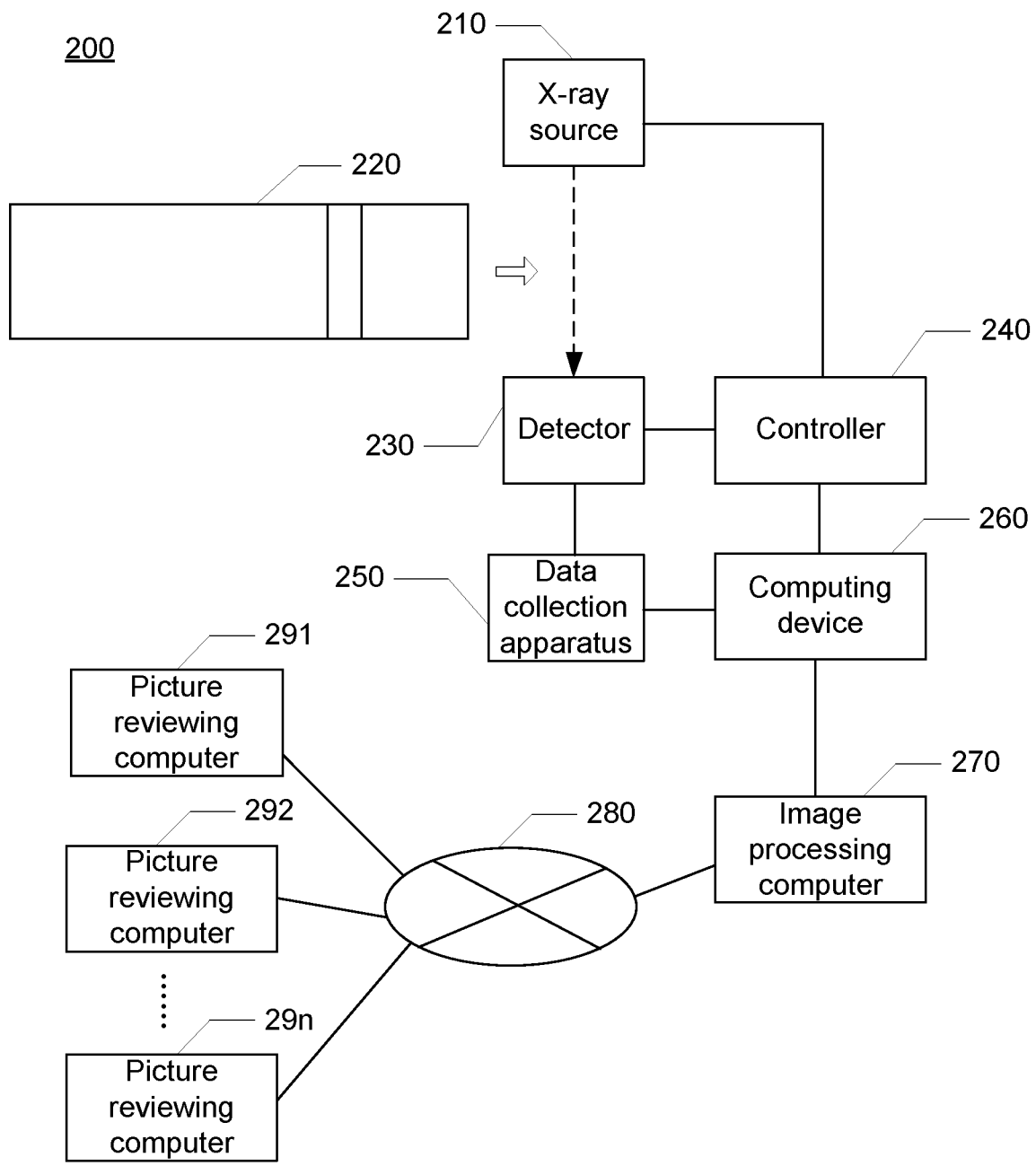
FIG. 2 illustrates a schematic structural diagram of a security inspection system according to another embodiment of the present disclosure.

FIG. 2 illustrates a schematic structural diagram of a security inspection system 200 according to an embodiment of the present disclosure. As shown in FIG. 2, the security inspection system 200 according to the embodiment of the present disclosure comprises an X-ray source 210, a detector 230, a data collection apparatus 250, a controller 240, and a computing device 260. The security inspection system 200 is configured to perform security inspection on an object to be inspected 220, such as a container truck etc., so as to determine whether at least one of dangerous goods and a suspicious item is included in the object to be inspected 220. Although the detector 230 and the data collection apparatus 250 are separately described in this embodiment, it may be understood by those skilled in the art that they may also be integrated together and may be referred to as an X-ray detection and data collection device.

According to some embodiments, the X-ray source 210 described above may be an isotope, an X-ray machine or an accelerator etc. The X-ray source 210 may be a single-energy ray source or a dual-energy ray source. Thus, transmission scanning may be performed on the object to be inspected 220 through the X-ray source 210, the detector 250, the controller 240 and the computing device 260, so as to obtain detection data. For example, during the traveling of the object to be inspected 220, an operator issues an instruction through the controller 240 with the aid of a human-computer interaction interface of the computing device 260, to instruct the X-ray source 210 to emit rays, which are received by the detector 230 after passing through the object to be inspected 220, and then are converted into an electrical signal. The electrical signal is then converted into a digital signal by the data collection apparatus 250, and the digital signal is then processed by the computing device 260. This makes it possible to obtain a transmission image of the object to be inspected 220.

As shown in FIG. 2, the obtained transmission image is transmitted to a local on-site image processing computer 270 via local routes. The on-site image processing computer 270 is connected to a public network or a dedicated network 280. Picture reviewing computers 291, 292, 29*n* which are deployed remotely may be, for example, remote image processing computers deployed at a picture reviewing center, and may also be connected to the public network or the dedicated network 280.

Figure 3:
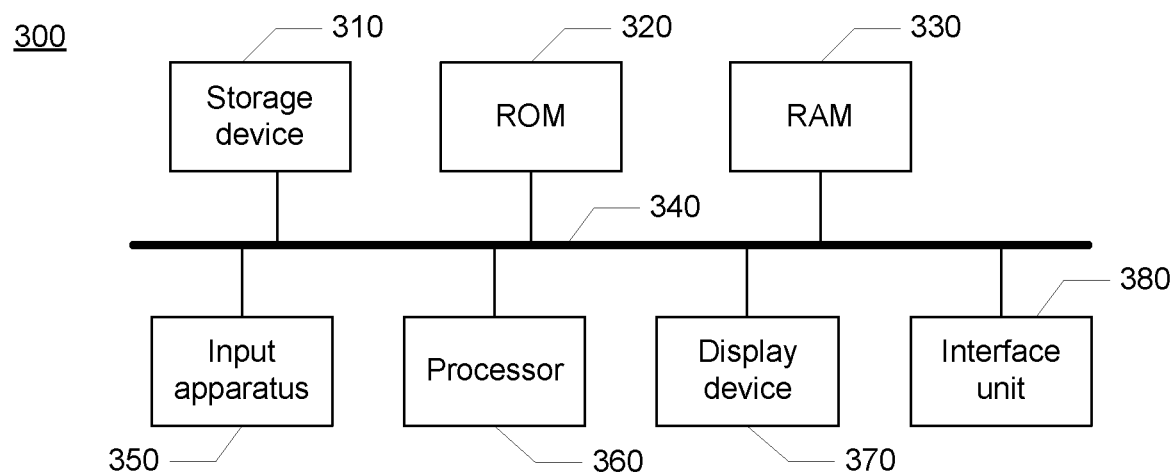
FIG. 3 illustrates a schematic hardware structural diagram of a computer according to an embodiment of the present disclosure.

FIG. 3 illustrates a schematic structural diagram of a computing device 300, for example, the computing device 260 shown in FIG. 2. As shown in FIG. 3, signals detected by the detector 230 are collected by a data collection apparatus, and are stored in a storage device 310 through an interface unit 380 and a bus 340. A Read Only Memory (ROM) 320 is used to store configuration information and programs of a data processor of the computer device. A Random Access Memory (RAM) 330 is used to temporarily store various data during an operation of a processor 360. In addition, computer programs for performing data processing such as a substance recognition program, an image processing program etc. are also stored in the storage device 310. The bus 340 is connected to the storage device 310, the ROM 320, the RAM 330, an input apparatus 350, the processor 360, a display device 370, and the interface unit 380 described above.

After a user inputs an operation command through the input apparatus 350 such as a keyboard, a mouse etc., instruction codes of the computer programs direct the processor 360 to execute a predetermined data processing algorithm. After obtaining a data processing result, the data processing result is displayed on the display device 370, for example, a Liquid Crystal Display (LCD) display. Alternatively, the data processing result is output directly in a form of a hard copy such as printing.

Figure 4:
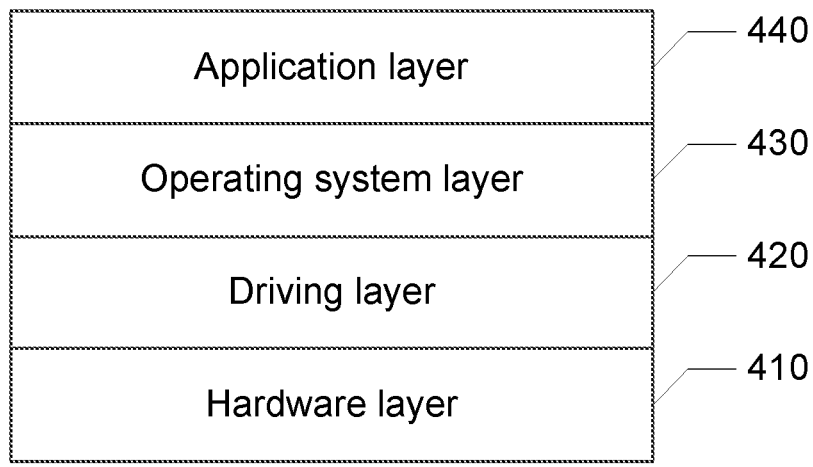
FIG. 4 illustrates a schematic logical architecture diagram of a computer according to an embodiment of the present disclosure.

FIG. 4 illustrates a schematic logical architecture diagram of a computer 400 according to an embodiment of the present disclosure. As shown in FIG. 4, the computer (computing device) according to the embodiment of the present disclosure may have a four-layer logical structure, including, for example, a hardware layer 410, a driving layer 420, an operating system layer 430, and an application layer 440. For example, the hardware layer 410 comprises various hardware shown in FIG. 3, such as a CPU, the input apparatus, the storage device etc. The driving layer 320 comprises driving programs for driving the various hardware described above, and is configured to establish a bridge between the hardware layer and the operating system, so that an operation, for example, an input/output operation etc., may be performed on the hardware through software. The operating system may be, for example, Windows, Linux etc., which receives an external input, allocates threads or resources, processes data or events, and outputs a processing result. For example, the operating system has a remote login function which enables login through remote computers and enables logging in other remote computers. The application layer 440 is, for example, an image processing program for, for example, edge enhancement, local enhancement, grayscale stretching etc., and may process an X-ray image according to a user's operation to obtain a processing result.

As shown in FIG. 2, a security inspection sub-system including, for example, the X-ray source 210, the detector 230, the data collection apparatus 250, the controller 240, and the computing device 260 is deployed on-site at a customs inspection station, so as to perform ray scanning on the object to be inspected 220 and obtain a radiographic image of the object to be inspected.

The image processing computer 270 which is deployed on-site at the customs inspection station may comprise hardware devices, an operating system, and an image processing application, is in communication with the security inspection sub-system, and is configured to store and process an X-ray image in real time.

The picture reviewing computers (image processing computers) 291, 292, 29n which are deployed remotely are communicatively connected to the image processing computer 270 which is deployed on-site via at least one of a public network and a dedicated network, and are configured to log in the image processing computer 270 through a remote access function, to synchronize remote data on a screen of the on-site image processing computer 270 to the remote image processing computers 291, 292, 29n, for review by an operator of the remote image processing computers 291, 292, 29n. Since only a part of the data displayed on the screen is synchronized to the remote picture reviewing computers, it is possible to review a radiographic image of the object to be inspected 220 without transmitting the entire radiographic image of the object to be inspected 220 to the remote picture reviewing computers.

Figure 5:
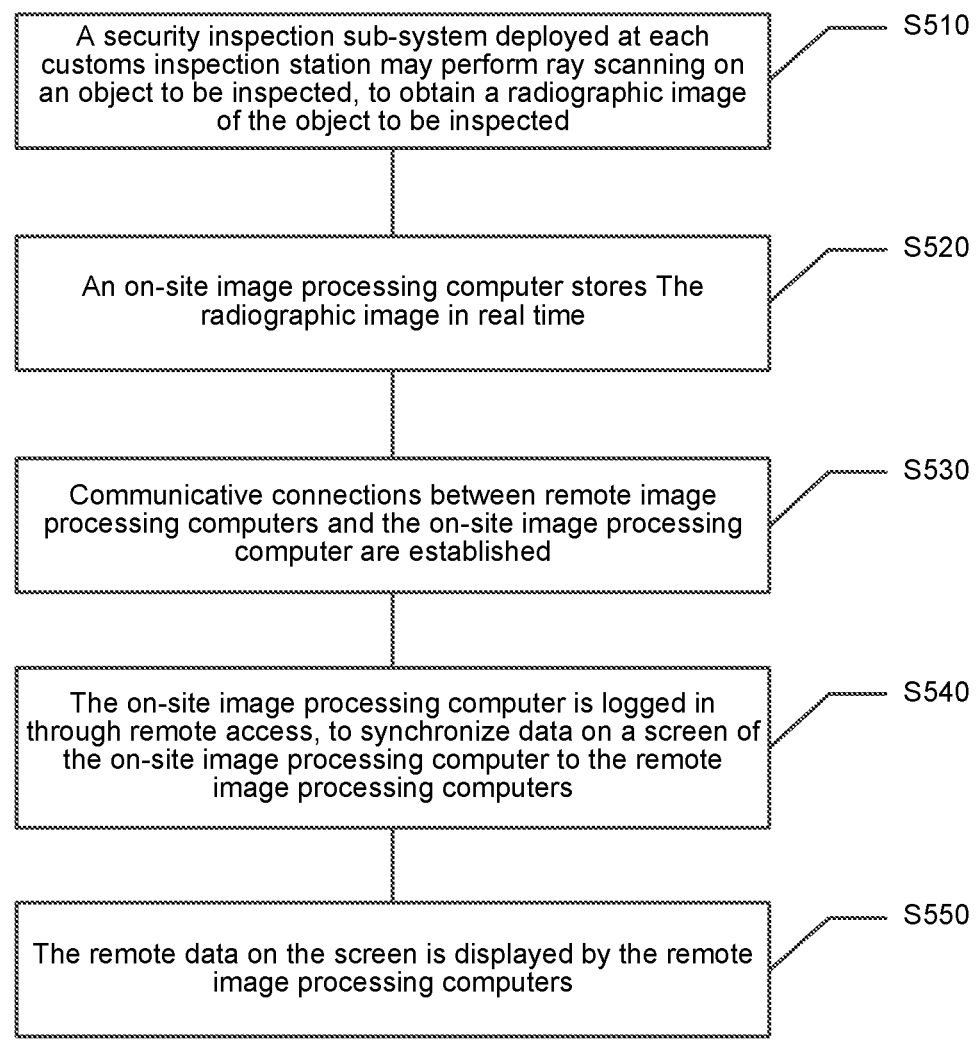
FIG. 5 illustrates a schematic flowchart of a security inspection method according to an embodiment of the present disclosure.

FIG. 5 illustrates a schematic flowchart of a security inspection method according to an embodiment of the present disclosure.

As shown in FIG. 5, in step S510, a security inspection sub-system deployed at each customs inspection station may perform X-ray scanning on an object to be inspected 220, for example, perform transmission scanning on a container truck, to obtain an X-ray image of the object to be inspected.

In step S520, the scanned X-ray transmission image is transmitted to the on-site image processing computer 270 in real time, and the on-site image processing computer 270 stores and/or performs image processing on the scanned X-ray transmission image in real time.

In step S530, communicative connections between the picture reviewing computers 291, 292, 29n which are deployed remotely and the local image processing computer 270 are established through the public network or dedicated network 280. It is of course also possible to establish the communicative connections with the picture reviewing computers 291, 292, 29n at the beginning of processing the object to be inspected. In short, it only needs to establish the communicative connections between the remote picture reviewing computers and the local computer before remote login.

In step S540, the picture reviewing computer 291, 292, 29n which are deployed remotely log in the on-site image processing computer through a remote access function, to synchronize data on a screen of the on-site image processing computer to the remote picture reviewing computers.

Then, in step S550, the X-ray image of the object to be inspected 220 is inspected by a picture reviewer at the picture reviewing computers to determine whether dangerous goods or a smuggled item is contained therein. For example, the image displayed on the screen is enhanced or transformed by using an input apparatus at the picture reviewing computers which are deployed remotely to enable inspection of detailed portions.

As described above, according to an embodiment of the present disclosure, there is provided a method for reviewing a picture in real time without transmission of an original image. The solution according to the embodiment described above is more effective in an environment with an insufficient network speed. Since the original image needs not to be transmitted, the image, business data, and suspicious marks may be generated and stored separately at the same time, which has a good protection effect on the original image, while greatly improving the processing efficiency of businesses.

Figure 6:
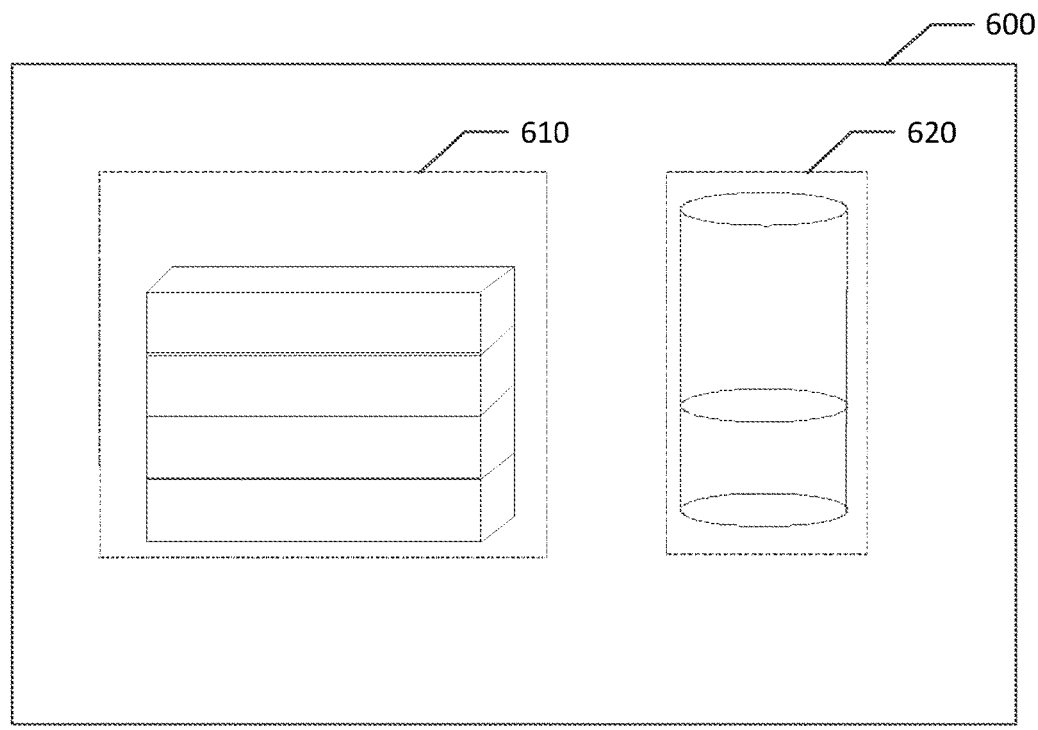
FIG. 6 illustrates a schematic diagram of filtering out image frames according to an embodiment of the present disclosure.
Figure 7:
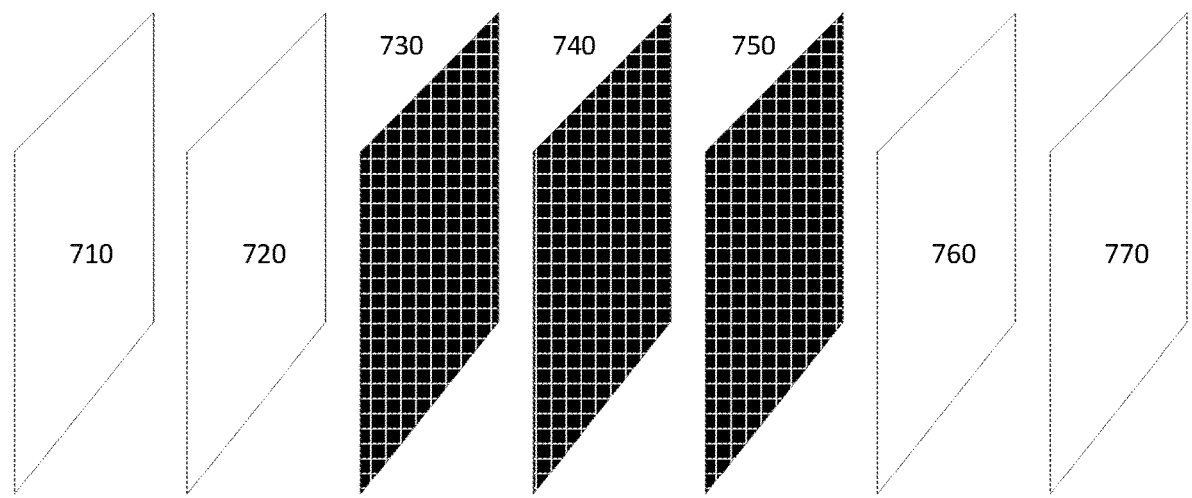
FIG. 7 illustrates a schematic diagram of merging regions related to a plurality of rendering commands according to an embodiment of the present disclosure.

FIG. 6 illustrates a schematic diagram of filtering out image frames according to an embodiment of the present disclosure. FIG. 7 illustrates a schematic diagram of merging regions related to a plurality of rendering commands according to an embodiment of the present disclosure.

When a transmission strategy is formulated, graphics commands generated by window systems of the remote picture reviewing computers 291, 292, 29n are firstly placed in an intermediate queue to detect whether there is an overlap among regions changed through the commands, and in a case where there is an overlap among the regions, the related commands are merged to generate a display update for the regions. In this way, a refresh frequency may be adjusted according to different bandwidths, to improve the user experiences.

As shown in FIG. 6, a first object 610 and a second object 620 may be included in a screen 600. If it is required by a user to process images of the two objects, regions related to rendering commands for the two objects are merged, and then image data of the merged regions is synchronized from the image processing computer 270 which is deployed locally to the picture reviewing computer 291, 292, 29n which are deployed remotely. For example, when a bandwidth is less than 512 K/sec, frames with an overlap rate of about 80% are filtered and are then transmitted within 0.5 second; otherwise, all the frames are transmitted.

As shown in FIG. 7, when the picture reviewing computers interact with the image processing machines remotely, for a given screen rendering region, since the time during which two image frames are switched is less than $\frac{1}{24}$ second, the two image frames may not be distinguished by human eyes within the limited time. Therefore, in a case of insufficient network bandwidth, data of certain image frames may be filtered out. For example, in FIG. 7, data of image frames 710, 720, 730, 740, 750, 760, 770 needs to be transmitted, but frames 730, 740, 750 may be filtered out according to network conditions, which avoids a part of the data to be transmitted without degrading the practical user experiences. For example, when the bandwidth is less than 512 K/sec, since the human eyes cannot distinguish pictures at a refresh frequency of more than 30 frames per second, image frames may be compressed to a certain extent to be less than 30 frames, which may not affect the actual visual effect.

In addition, in a poor bandwidth environment, for high-frequency image processing, if there is an actual effect of frequent buffering, the speed may be optimized in an image compression manner. A number of effective pixels of the compressed image is reduced, which results in a distortion effect, but is more suitable for transmission. For example, a compressed image of a high-resolution image is firstly generated dynamically, and a remote user directly interacts with the compressed image. If the user needs to view details of the image, a task assignment program switches corresponding frames to a high resolution mode after the user issues a detail view command, which can meet the business needs of image processing when the bandwidth is seriously insufficient. For example, when the bandwidth is less than 512 K/sec, the image data may be sampled. During the sampling, for a non-critical region such as a blank region etc., an algorithm with high compression efficiency may be used, and for a critical region (for example, a container portion) in an actual image region, an algorithm with low compression efficiency may be used. In this way, different sampling strategies are adopted for data transmission, which may achieve a better actual effect.

Figure 8:
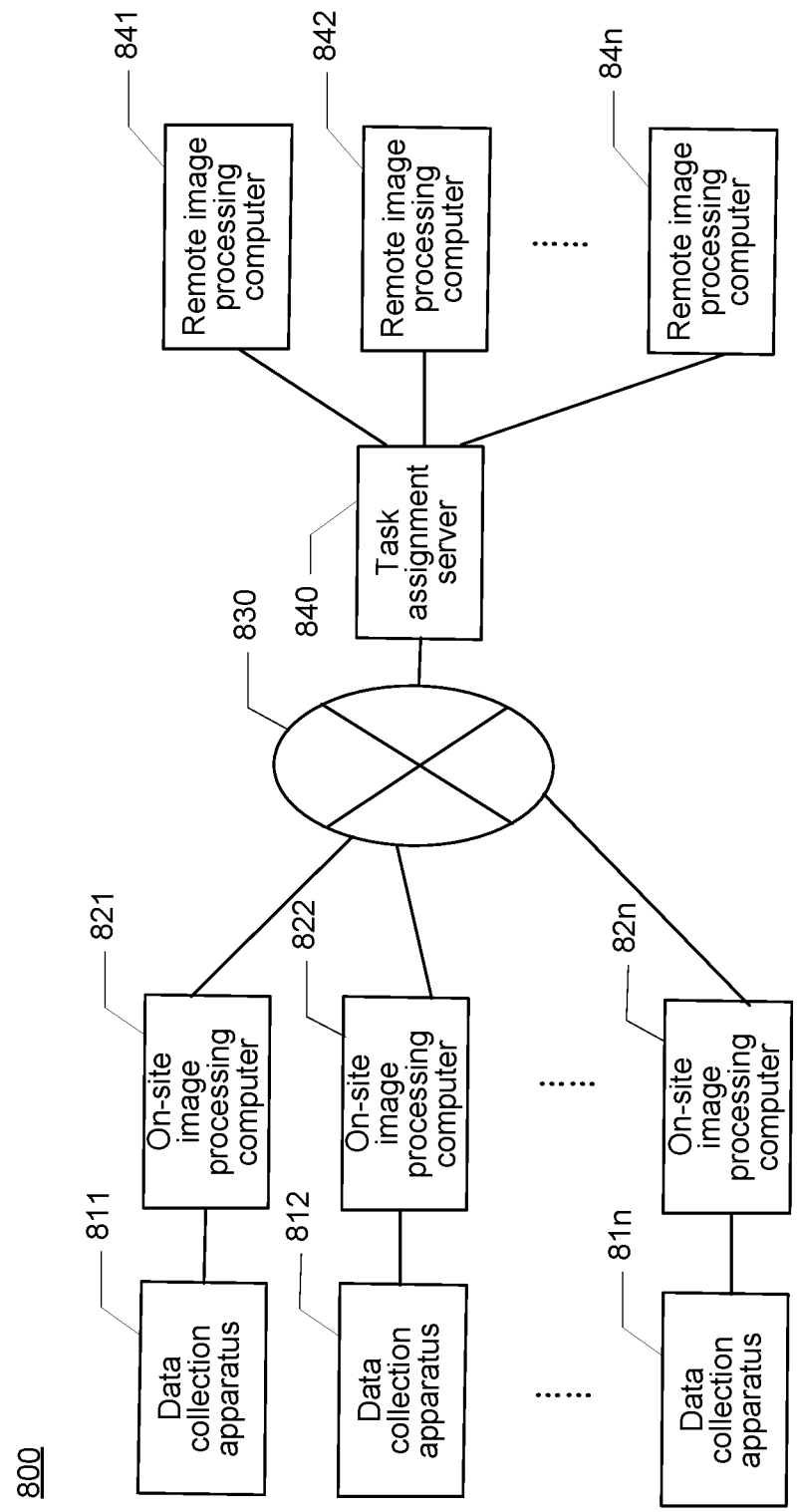
FIG. 8 illustrates a schematic structural diagram of a security inspection system according to another embodiment of the present disclosure.

FIG. 8 illustrates a structural diagram of a security inspection system 800 according to another embodiment of the present disclosure. As shown in FIG. 8, the security inspection system 800 according to the embodiment of the present disclosure comprises data collection apparatuses 611, 612, 61n deployed at inspection sites, and on-site image processing computers 621, 622, 62n which are connected to the data collection apparatuses 611, 612, 61n respectively and deployed at the inspection sites. The on-site image processing computers 621, 622, 62n are connected to a task assignment server 640 through a public network or a dedicated network 630. The task assignment server 640 is in communicative connection with remote image processing computers 641, 642, 64n, determines one of the on-site image processing computers 621, 622 62n to be connected according to an access request from a corresponding one of the remote image processing computers 641, 642 64n, and establishes a communicative connection between the on-site image processing computer and the remote image processing computer.

In addition, different strategies are used by the task assignment server 640 for different image processing. Applications which are used frequently and applications which are used infrequently are analyzed by performing statistics on image processing applications. A number and processing power of corresponding image processors should be increased for the applications which are used frequently, and a number and configuration of corresponding image processors should be reduced for applications which are used infrequently. For image processing applications which require using graphics image computing capabilities of a graphics card, a high-performance computing image processor is deployed in a targeted manner, which may improve the use efficiency of hardware.

With the embodiments described above, remote real-time picture reviewing may be performed in a case of poor bandwidth quality, thereby alleviating the problem that a large image is transmitted too slowly in a case of an insufficient bandwidth. In particular, the implementation effect of a centralized picture reviewing system in the field of customs etc. in a poor bandwidth environment has been improved.

The foregoing detailed description has set forth various embodiments of the security inspection system and security inspection method via the use of diagrams, flowcharts, and/or examples. In a case that such diagrams, flowcharts, and/or examples contain one or more functions and/or operations, it will be understood by those skilled in the art that each function and/or operation within such diagrams, flowcharts or examples may be implemented, individually and/or collectively, by a wide range of structures, hardware, software, firmware, or virtually any combination thereof. In one embodiment, several portions of the subject matter described in the embodiments of the present disclosure may be implemented via Application Specific Integrated Circuits (ASICs), Field Programmable Gate Arrays (FPGAs), Digital Signal Processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of those skilled in the art in ray of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the embodiments of the present disclosure have been described with reference to several typical embodiments, it is apparent to those skilled in the art that the terms are used for illustration and explanation purpose and not for limitation. The embodiments of the present disclosure may be practiced in various forms without departing from the spirit or essence of the embodiments of the present disclosure. It should be understood that the embodiments are not limited to any of the foregoing details, and shall be interpreted broadly within the spirit and scope as defined by the following claims. Therefore, all of modifications and alternatives falling within the scope of the claims or equivalents thereof are to be encompassed by the claims as attached.

We claim:

1. A security inspection system, comprising:
   at least one inspection sub-system deployed at an inspection site and configured to perform ray scanning on an object to be inspected to obtain a radiographic image of the object to be inspected;
   at least one on-site image processing computer deployed at the inspection site and communicatively connected to the at least one inspection sub-system, wherein the at least one on-site image processing computer each comprises a hardware device, an operating system, and an image processing application, and is configured to store and process the radiographic image in real time; and at least one remote reviewing image processing computer communicatively connected to the at least one on-site image processing computer via at least one of a public network and a dedicated network, and each configured to log in one of the at least one on-site image processing computer through remote access to synchronize remote data on a screen of the on-site image processing computer to the at least one remote reviewing image processing computer for display of the remote data on a remote screen of the at least one remote reviewing image processing computer, wherein the at least one remote reviewing image processing computer is further configured to receive a graphics command input by an operator, check whether there is an overlap among image regions changed through the graphics command, and in response to there is the overlap, merge the regions related to the graphics command to generate a display update of the remote data on the remote screen; and wherein the at least one remote reviewing image processing computer is further configured to filter out a part of image frames of the remote data on the screen of the on-site image processing computer according to a bandwidth of a network connected to the at least one remote reviewing image processing computer and the on-site image processing computer, to generate a display update of the remote data on the remote screen, in response to the bandwidth being lower than a threshold, wherein the threshold is set based on a refresh frequency for human eyes.

2. The security inspection system according to claim 1, further comprising:

a task assignment server communicatively connected to the at least one on-site image processing computer and the at least one remote reviewing image processing computer, and configured to determine one of the at least one on-site image processing computer to be connected according to an access request from a corresponding one of the at least one remote reviewing image processing computer, and establish a communicative connection between the on-site image processing computer and the at least one remote reviewing image processing computer.

3. The security inspection system according to claim 2, wherein the task assignment server is further configured to perform statistics on at least one of an operational load and use efficiency of an image processing application in the on-site image processing computer during a period of time, and suggest to a user to update the on-site image processing computer.

4. The security inspection system according to claim 1, wherein the at least one remote reviewing image processing computer is further configured to adjust a screen refresh frequency of the at least one remote reviewing image processing computer according to a size of a bandwidth in response to determining that the bandwidth is below a predetermined threshold.

5. The security inspection system according to claim 4, wherein the at least one remote reviewing image processing computer is further configured to filter out given image frames for a particular rendering area on the remote screen.

6. The security inspection system according to claim 1, wherein the on-site image processing computer is further configured to compress the X-radiographic image, transmit the compressed X-radiographic image to the at least one remote reviewing image processing computer for display, and in response to receiving a detail view instruction from a user, adjust a display mode of a particular rendering area to a resolution mode higher than that for the X-radiographic image.

7. An inspection method, comprising:

performing, by an inspection sub-system deployed at an inspection site, ray scanning on an object to be inspected to obtain a radiographic image of the object to be inspected;

storing the radiographic image in an on-site image processing computer in real time;

establishing a communicative connection between a remote reviewing image processing computer and the on-site image processing computer;

logging in, at the remote reviewing image processing computer, the on-site image processing computer through remote access, to synchronize remote data on a screen of the on-site image processing computer to the remote reviewing image processing computer for display of the remote data on a remote screen of the remote reviewing image processing computer;

receiving, at the remote reviewing image processing computer, a graphics command input by an operator, checking whether there is an overlap among image regions changed through the graphics command, and in response to there is the overlap, merging the regions related to the graphics command to generate a display update of the remote data on the remote screen; and filtering out, at the remote reviewing image processing computer, a part of image frames of the remote data on the screen of the on-site image processing computer according to a bandwidth of a network connected the remote reviewing image processing computer and the on-site image processing computer, to generate a display update of the remote data on the remote screen, in response to the bandwidth being lower than a threshold, wherein the threshold is set based on a refresh frequency for human eyes.

8. The inspection method according to claim 7, further comprising:

determining, by a task assignment server, an on-site image processing computer to be connected according to an access request from the remote reviewing image processing computer, and establishing a communicative connection between the on-site image processing computer and the remote reviewing image processing computer.

9. The inspection method according to claim 8, further comprising:

performing, by the task assignment server, statistics on at least one of an operational load and use efficiency of an image processing application in the on-site image processing computer during a period of time, and suggesting to a user to update the on-site image processing computer.

* * * * *